(12) United States Patent
Shirakawa et al.

(10) Patent No.: US 7,859,450 B2
(45) Date of Patent: Dec. 28, 2010

(54) DETECTION AND RANGING APPARTUS AND DETECTION AND RANGING METHOD

(75) Inventors: Kazuo Shirakawa, Kawasaki (JP); Katsuyuki Ohguchi, Hyogo (JP); Yasuyuki Kondo, Hyogo (JP)

(73) Assignees: Fujitsu Limited, Kawasaki (JP); Fujitsu Ten Limited, Kobe (JP)

( * ) Notice: Subject to any disclaimer, the term of this patent is extended or adjusted under 35 U.S.C. 154(b) by 245 days.

(21) Appl. No.: 12/200,024

(22) Filed: Aug. 28, 2008

(65) Prior Publication Data
US 2009/0079617 A1    Mar. 26, 2009

(30) Foreign Application Priority Data
Sep. 26, 2007    (JP) .............................. 2007-249822

(51) Int. Cl.
*G01S 13/00* (2006.01)
*H04B 1/00* (2006.01)

(52) U.S. Cl. ........................ 342/147; 342/70; 375/130

(58) Field of Classification Search ............ 342/70–72, 342/118, 128–139, 147; 340/901–904, 435–437; 375/130, 135, 138, 146, 269, 279, 308
See application file for complete search history.

(56) References Cited

U.S. PATENT DOCUMENTS

| | | | | | |
|---|---|---|---|---|---|
| 4,241,347 | A | * | 12/1980 | Albanese et al. ............... | 342/89 |
| 4,443,799 | A | * | 4/1984 | Rubin ......................... | 342/201 |
| 4,876,549 | A | * | 10/1989 | Masheff ...................... | 342/417 |
| 5,136,611 | A | * | 8/1992 | Kirimoto et al. ............. | 375/130 |
| 5,657,021 | A | * | 8/1997 | Ehsani-Nategh et al. ...... | 342/70 |
| 5,724,041 | A | * | 3/1998 | Inoue et al. .................. | 342/70 |
| 6,031,485 | A | * | 2/2000 | Cellai et al. ................. | 342/131 |
| 6,125,378 | A | * | 9/2000 | Barbano ....................... | 708/254 |
| 6,288,672 | B1 | * | 9/2001 | Asano et al. ................. | 342/374 |
| 6,600,443 | B2 | * | 7/2003 | Landt .......................... | 342/42 |
| 7,046,186 | B2 | * | 5/2006 | Rosenberg et al. ............ | 342/45 |

(Continued)

FOREIGN PATENT DOCUMENTS

GB    20 24 557    1/1980

(Continued)

OTHER PUBLICATIONS

European Search Report with Written Opinion and the Annex to the European Search Report on European Patent Application No. EP08163216.8-2220/2045612. Dated Mar. 17, 2009.

(Continued)

*Primary Examiner*—Thomas H Tarcza
*Assistant Examiner*—Peter Bythrow
(74) *Attorney, Agent, or Firm*—Myers Wolin, LLC

(57) ABSTRACT

In a detection and ranging apparatus that performs direction-of-arrival estimation using a sensor array and that enlarges an effective aperture using a plurality of transmitting sensors, adverse effects associated with time division switching are eliminated, achieving high-accuracy measurement. A transmitter wave is spread in modulators by using mutually orthogonal codes, and the resulting transmitter waves are radiated from two transmitting sensors. Signals received by receiving sensors are each split by a splitter into two parts, which are then respectively despread in a demodulator by using the same codes as those used in the transmitter.

9 Claims, 7 Drawing Sheets

U.S. PATENT DOCUMENTS

| | | | | |
|---|---|---|---|---|
| 7,151,478 | B1* | 12/2006 | Adams et al. | 342/62 |
| 2001/0020917 | A1* | 9/2001 | Hamada et al. | 342/442 |
| 2004/0014433 | A1* | 1/2004 | Hamada et al. | 455/101 |
| 2004/0169602 | A1* | 9/2004 | Hamada et al. | 342/442 |
| 2004/0198393 | A1* | 10/2004 | Hamada et al. | 455/456.1 |
| 2004/0266354 | A1* | 12/2004 | Hamada et al. | 455/63.4 |
| 2006/0012511 | A1* | 1/2006 | Dooi et al. | 342/70 |
| 2006/0066474 | A1* | 3/2006 | Shirakawa | 342/147 |
| 2009/0079617 | A1* | 3/2009 | Shirakawa et al. | 342/146 |

FOREIGN PATENT DOCUMENTS

| | | |
|---|---|---|
| GB | 2024557 | 1/1980 |
| JP | 2000155171 | 6/2000 |
| JP | 2001237755 | 8/2001 |
| JP | 2004264067 | 9/2004 |
| JP | 2005257384 | 9/2005 |
| JP | 200629858 | 2/2006 |
| JP | 200698181 | 4/2006 |
| JP | 2007-199085 | 8/2007 |

OTHER PUBLICATIONS

Replacement European Search Report with written opinion for corresponding European Patent Application No. 08163216.8 issued by the European Patent Office on Oct. 28, 2009.

Kees N. et al.; "Improvement of Angular Resolution of a Millimeterwave Imaging System by Transmitter Location Multiplexing"; IEEE MTT-S International Orlando, FL IEEE, US; pp. 969-972; XP010141425; May 16, 1995; [Ref.: Replacement ERS dated Oct. 28, 2009].

* cited by examiner

DETECTION AND RANGING APPARTUS AND DETECTION AND RANGING METHOD

BACKGROUND OF THE INVENTION

1. Field of the Invention

The present invention relates to a detection and ranging apparatus and detection and ranging method having a function for estimating the direction of arrival of a signal by using a sensor array and a direction-of-arrival estimation method.

2. Description of the Related Art

As an example of such a detection and ranging apparatus, consider a radar apparatus capable of estimating all three quantities, i.e., relative distance, relative velocity, and angular direction of a target. In a radar, a sensor refers to an antenna. FM-CW radar is a type of radar that projects forward a transmitter wave frequency-modulated by a triangular wave or the like, and receives a reflected wave from a target, mixes it in a mixer with a portion of the transmitted signal to obtain a baseband signal containing information on the target, and calculates the distance and relative velocity of the target from the baseband signal, and this type of radar is commercially implemented as automotive radar, etc.

One possible method for determining the direction in which the target is located is to use an array antenna having a plurality of antenna elements to receive the reflected wave from the target, and to determine the direction of the target by applying a direction-of-arrival estimation method such as a known beam former method to the received signal.

In a direction-of-arrival estimation method using an array antenna, for example, in the beam former method that scans the main lobe of the array antenna in a given direction and determines the direction where the output power is the greatest as being the direction of arrival, the beam width of the main lobe determines the angular resolution, and therefore, if it is desired to increase the resolution so that the directions of many targets can be determined, the aperture length of the array must be increased by increasing the number of antenna elements. The same can be said of the minimum norm (Min-Norm) method that determines the direction of arrival from the eigenvalue and eigenvector of the correlation matrix of the array's received signal, and its extended algorithms such as MUSIC (MUltiple SIgnal Classification) and ESPRIT (Estimation of Signal Parameters via Rotational Invariance Techniques), i.e. in these methods also, since the dimension of the correlation matrix, i.e., the number of antenna elements, determines the number of targets that can be detected, the number of antenna elements must be increased in order to be able to determine the directions of many targets.

However, in the case of a radar apparatus such as an automotive radar where severe constraints are imposed on the mounting dimensions of the antenna, it has been difficult to increase the number of antenna elements without compromising reception power.

JP 2006-98181A and JP 2000-155171A each propose a method that enlarges the effective aperture by using a plurality of transmitting antennas.

In this case, for each received reflected wave, the transmitting antenna that transmitted the original radiowave must be identified. In the above patent documents, each one of the plurality of transmitting antennas is selected for use in time division fashion by using a switch so that the transmitting antenna can be identified for each received wave. Further, on the receiver side each one of the plurality of receiving antennas is selected in time division fashion by using a switch, in order to reduce the cost by reducing the amount of RF circuitry.

However, switching from one antenna to another using a switch involves adverse effects such as degradation in signal and reduction in detection range. Furthermore, since it does not follow that the waves transmitted out from the plurality of transmitting antennas and returned by reflection are received simultaneously by the plurality of receiving antennas, there arises the problem that a time shift and a phase shift occur. This problem can be alleviated by increasing the switching speed, but there is naturally a limit to it.

Further, in JP 2001-237755A, which relates to a different field than the present invention, i.e., to a so-called phase monopulse scheme in which radiowaves transmitted from two antennas at a base station in a mobile communication system are received by one antenna at a mobile station to determine the direction based on the difference between the arriving phases, it is described that the radiowaves are spread using mutually orthogonal spreading codes so that the transmitting antennas that transmitted the respective radiowaves can be discriminated at the receiving end.

SUMMARY OF THE INVENTION

Accordingly, it is an object of the present invention to provide a detection and ranging apparatus that uses a plurality of transmitting sensors in order to enlarge the effective aperture of a sensor array having a plurality of sensor elements, wherein provisions are made to eliminate the adverse effects associated with the time division switching and thereby achieve a high-accuracy measurement.

The above object is achieved by a detection and ranging apparatus comprising: M spreaders for generating M spread transmitter waves by spreading a transmitter wave using mutually orthogonal M orthogonal codes, where M is an integer not smaller than 2; M transmitting sensor elements for transmitting out the M spread transmitter waves; N receiving sensor elements, where N is an integer not smaller than 2; receiving control means for splitting each of N received signals obtained at the N receiving sensor elements into M parts, and for generating M×N despread outputs by despreading the split received signals using the M orthogonal codes; and direction-of-arrival estimating means for estimating, based on the M×N despread outputs, directions of arrival of reflected signals arriving from a plurality of targets.

The above object is also achieved by a detection and ranging method for detecting a direction of arrival of a signal, wherein signals to be input to M transmitting sensor elements are respectively spread by mutually orthogonal M orthogonal codes and transmitted out simultaneously from the M transmitting sensor elements, where M is an integer not smaller than 2, and signals output from N receiving sensor elements are each split into M parts, which are then respectively despread using the M orthogonal codes.

DESCRIPTION OF THE PREFERRED EMBODIMENTS

Figure 1:
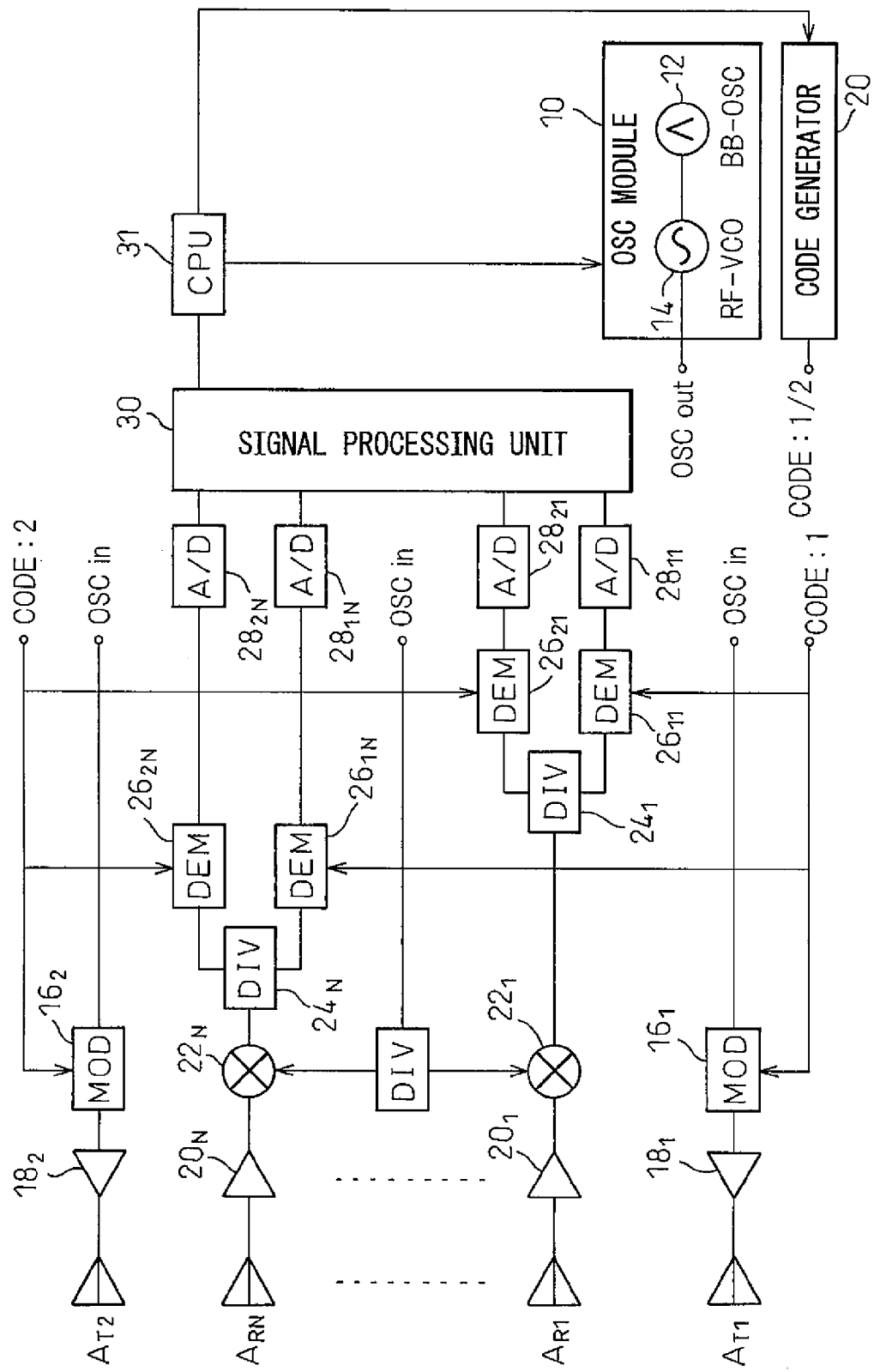
FIG. 1 is a block diagram of a radar apparatus according to one embodiment of the present invention.

FIG. 1 shows the configuration of a radar apparatus according to an embodiment. The example shown in FIG. 1, similarly to the one shown in JP 2006-98181A, uses a receiving array antenna comprising N antenna elements $A_{R1}$ to $A_{RN}$ and a transmitting array antenna comprising two (M=2) antenna elements $A_{T1}$ and $A_{T2}$ arranged on both sides of the receiving array antenna.

An oscillator module 10 includes an oscillator 12 for generating a baseband signal such as a triangular wave and a voltage-controlled RF (Radio Frequency) oscillator 14 whose frequency is controlled by the output of the oscillator 12, and generates a transmitter wave frequency-modulated by the triangular wave. A code generator 20 generates mutually orthogonal two PN codes 1 and 2. The transmitter wave frequency-modulated by the triangular wave is directly spread by binary phase-shift keying (BPSK) using the PN codes 1 and 2 in modulators $16_1$ and $16_2$, and the resulting transmitter waves are fed via power amplifiers $18_1$ and $18_2$ to the antennas $A_{T1}$ and $A_{T2}$ for transmission.

N signals received by the antenna elements $A_{R1}$ to $A_{RN}$ are fed via low-noise amplifiers $20_1$ to $20_N$ to mixers $22_1$ to $22_N$ where each signal is downconverted using the transmitter wave before spreading that is output from the oscillator module 10. The outputs of the N mixers $22_1$ to $22_N$ are each split by a corresponding one of splitters $24_1$ to $24_N$ into two parts, and are despread in 2N demodulators $26_{11}$ to $26_{2N}$ by using the same PN codes 1 and 2 as those used at the transmitter end. The 2N despread results from the demodulators $26_{11}$ to $26_{2N}$ are converted by A/D converters $28_{11}$ to $28_{2N}$ into digital signals which are input to a signal processing unit 30.

As will be described later, reflected waves of the transmitter wave transmitted from the antenna element $A_{T1}$ are received by the antenna elements $A_{R1}$ to $A_{RN}$ and downconverted by the mixers $22_1$ to $22_N$, and the demodulators $26_{11}$ to $26_{1N}$ despread them by the code 1; this means that a baseband signal of a conventional radar having a transmitting antenna at the position of $A_{T1}$ is output from the demodulators $26_{11}$ to $26_{1N}$. Similarly, reflected waves of the transmitter wave transmitted from the antenna element $A_{T2}$ are received by the antenna elements $A_{R1}$ to $A_{RN}$ and downconverted by the mixers $22_1$ to $22_N$, and the demodulators $26_{21}$ to $26_{2N}$ despread them by the code 2; this means that a baseband signal of a conventional radar having a transmitting antenna at the position of $A_{T2}$ is output from the demodulators $26_{21}$ to $26_{2N}$. Accordingly, the result when reflected waves of the transmitter wave transmitted from the antenna element $A_{T1}$ are received by the antenna elements $A_{R1}$ to $A_{RN}$ and the result when reflected waves of the transmitter wave transmitted from the antenna element $A_{T2}$ are received by the antenna elements $A_{R1}$ to $A_{RN}$ are obtained at the same time and without interruption.

The signal processing unit 30 applies FFT (Fast Fourier Transformation) to these signals and calculates the distance and the relative velocity with respect to a target from the peak frequencies obtained by FFT in the upsweep and downsweep sections of the triangular wave. Further, the direction of each target is determined by applying a direction-of-arrival estimation method such as the beam former method at a target presence indicating frequency position obtained by FFT. If it is necessary to estimate the number of targets before the direction estimation, a number-of-targets estimation method based on such as AIC (Akaike's Information Criterion) is used as the preprocessing.

Figure 2:
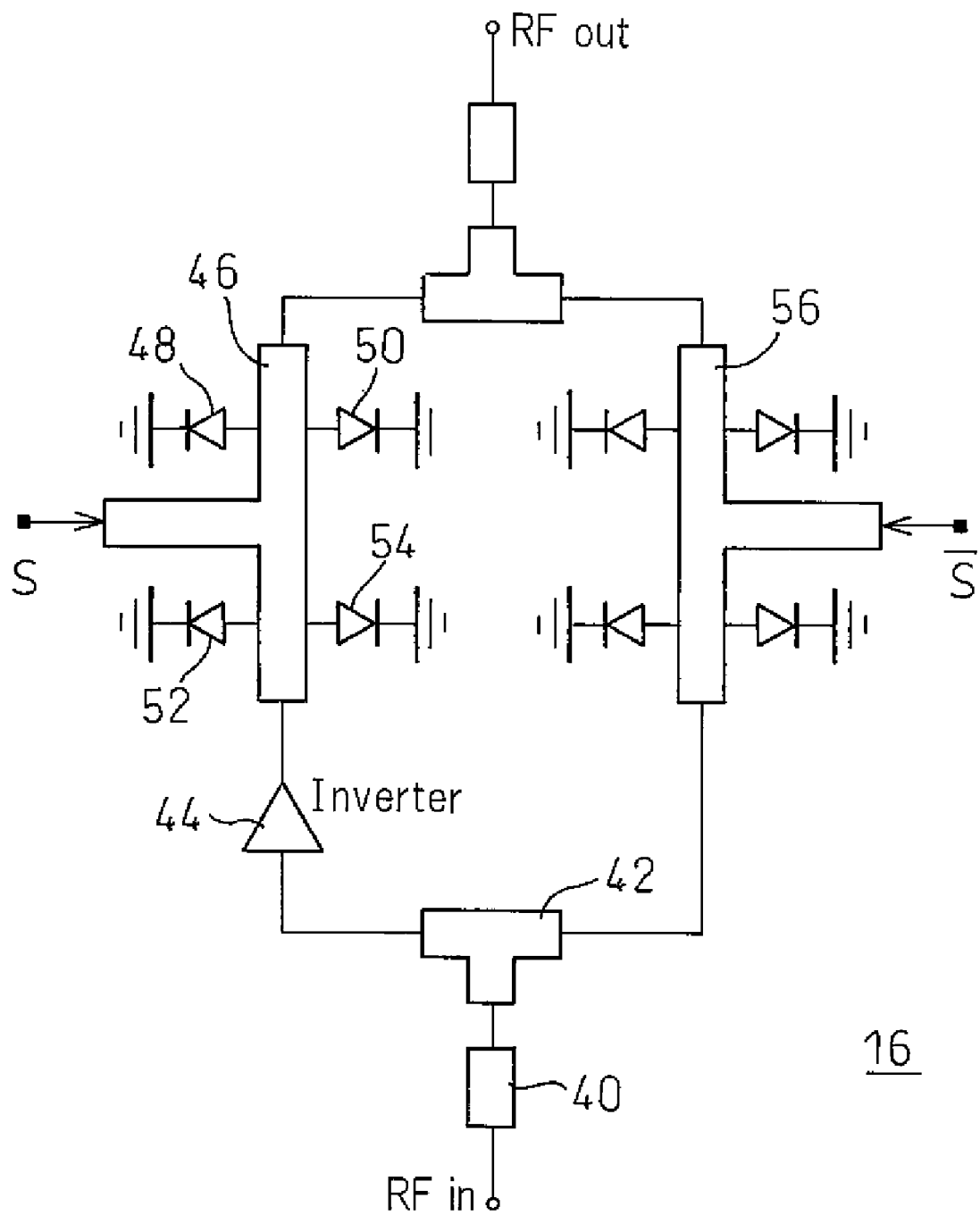
FIG. 2 is a diagram showing one configuration example of a modulator 16 ($16_1$, $16_2$) in FIG. 1.

FIG. 2 shows one configuration example of the modulator $16_1$, $16_2$. The high-frequency signal fed via a transmission line 40 is split by a T-shaped transmission line 42 into two parts, and one is inverted in sign by an inverter 44 and thus shifted in phase by 180° and is thereafter supplied to a transmission line 46, while the other is supplied directly to a transmission line 56. If the DC potential of the transmission line 46 is at a high level, diodes 48, 50, 52, and 54 are forward biased, and the transmission line 46 is put in a short-circuited condition, thus blocking the transmission of the high-frequency wave, but if the DC potential is at a low level, the diodes 48, 50, 52, and 54 are reverse biased, and the transmission line 46 is put in a through-line condition, thus allowing the high-frequency wave to transmit therethrough. The same principle applies to the transmission line 56.

The logic value (for example, 0 or 1) S of the PN code generated by the code generator is converted to a suitable value as a bias voltage and applied as the DC potential to the transmission line 46, and the inverted logic value is applied to the transmission line 56. Accordingly, either the high-frequency signal whose phase is not shifted or the high-frequency signal whose phase is shifted by 180° is selected for output according to the value of the PN code.

Figure 3:
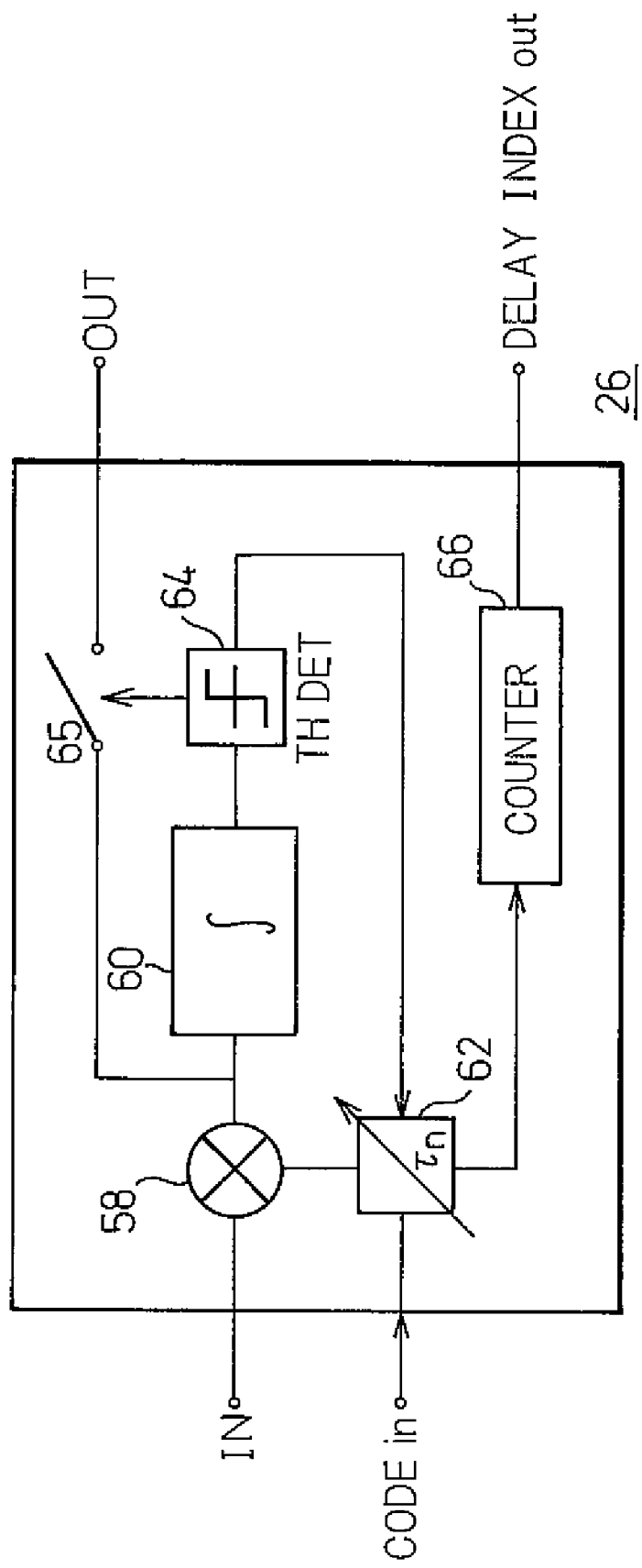
FIG. 3 is a diagram showing one configuration example of a demodulator 26 ($26_{11}$ to $26_{2N}$) in FIG. 1.

FIG. 3 shows one configuration example of the demodulator 26 ($26_{11}$ to $26_{2N}$). The received signal downconverted by the mixer 22 ($22_1$ to $22_N$) using the transmitter wave before spreading is input to the demodulator 26. In other words, the so-called beat signal as produced in conventional FM-CW radar and BPSK-modulated by the PN code is input here. This signal is multiplied in a multiplier 58 by a PN code as a ±1 bipolar signal, and the product is integrated over a period Tf by an integrator 60. The integration period Tf is set equal to the chip duration of the PN code multiplied by the code length, and the chip duration and the code length are chosen so that the integration period Tf becomes sufficiently shorter than the period of the beat signal. It is desirable that, to reduce the influence of the filtering effect by the code such as described later, the chip rate (the reciprocal of the chip duration) of the PN code be made greater than the maximum delay time to be measured, in particular when the main objective is to enlarge the aperture, and that the chip rate be set to a value sufficiently smaller than the width of the triangular wave frequency modulation in order to prevent the bandwidth of the transmitter wave from being expanded by the spreading to such an extent that interference is caused to other apparatus.

In the demodulator, since the integrator 60 is a component part for computing correlation for each code component contained in the incoming signal, if the PN code applied to the multiplier 58 matches one of PN codes contained in the incoming signal, and if the phase of the code also matches between them, the output of the integrator 60 for this code component takes a maximum value 1 (when normalized to non-spread signal power), while the output for the code component, if the phase does not match, is −1/(code length) (of course, generally 0 in the case of an orthogonal code). In view of this, the PN code is scanned by a variable delay device 62 by changing the phase of the PN code at time intervals of one chip (actually, it is changed at intervals of about ⅓ chip, but to simplify explanation, it is assumed to be changed at intervals of one chip), and when a correlation value exceeding a suitably set threshold value is detected by a decision-making device 64 provided at the output of the integrator 60, the variable delay device 62 stops the scanning, thus accomplishing synchronization acquisition. A counter 66 counts the number of pulses from the variable delay device 62, and outputs a delay index indicating the amount of delay introduced by the variable delay device 62; as will be described later, the distance to the target can also be calculated from the delay index after the synchronization acquisition. Once the synchronization is established, a switch 65 is turned on by a control signal from the decision-making device 64, and the beat signal before being spread by the PN code is output from the demodulator.

Since the N paralleled demodulators 26 are used for the same code, the time required to accomplish synchronization acquisition can be reduced to 1/N if the initial values of the delay amounts are set to 0, Tf/N, 2Tf/N, . . . , (N−1)Tf/N, respectively, where Tf represents the scan range (usually, the integration interval).

As an alternative configuration example of the demodulator, a matched filter, SAW convolver, etc., may be used. Of course, a series/parallel synchronization circuit, a DLL (Delay Locked Loop), or the like may be used as the synchronization acquisition circuit.

By constructing the transmitter IC from a GaAs HEMT, HBT, or like device that achieves high output power and the receiver IC from a CMOS or like device that has low output power but is well matched to the digital signal processing system that follows, the overall performance of the apparatus can be enhanced.

Figure 4:
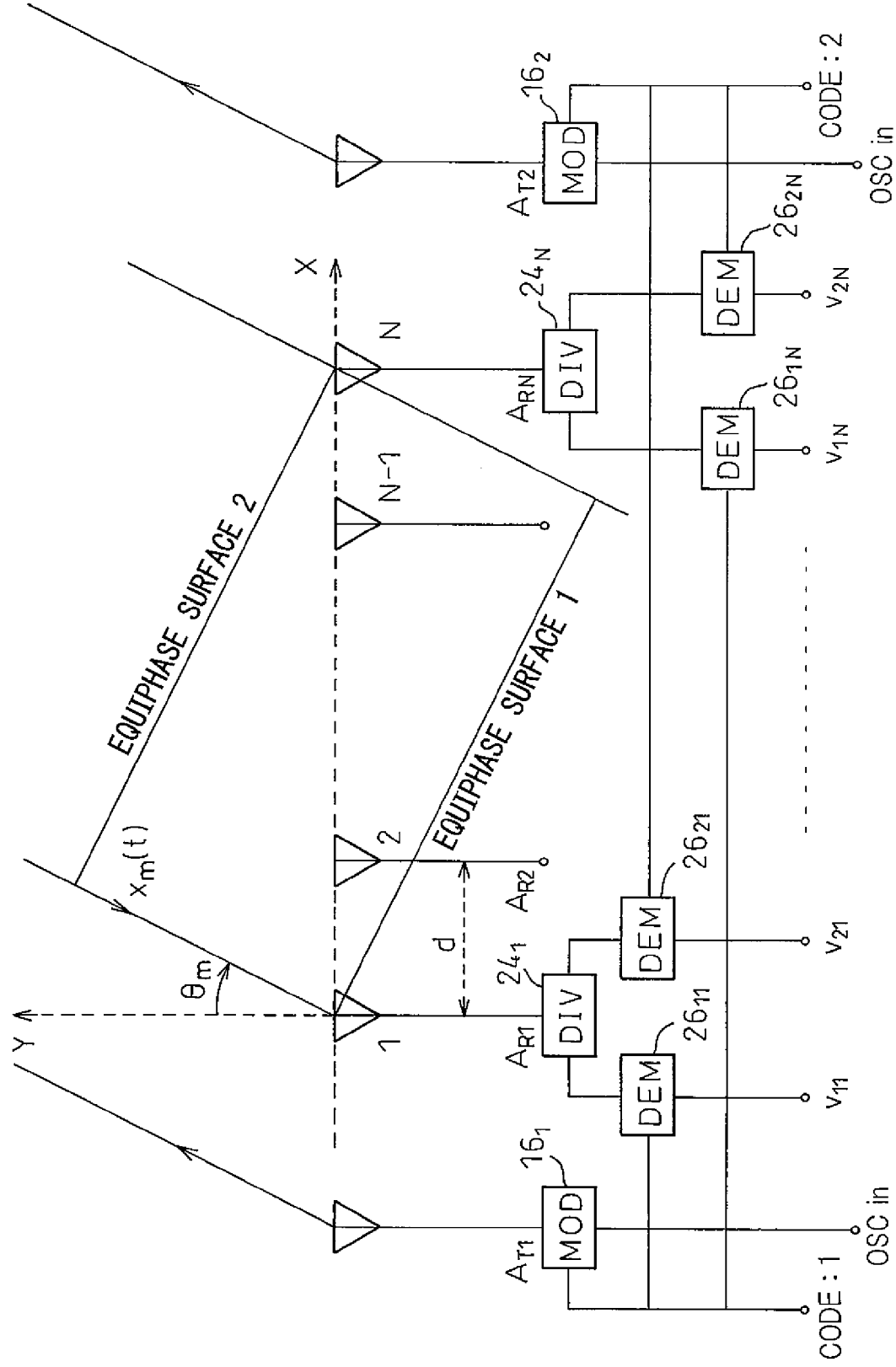
FIG. 4 is a diagram explaining the operation of the apparatus of FIG. 1.

FIG. 4 is a diagram showing the essential configuration extracted from FIG. 1. The transmitting and receiving antenna elements are arranged along the X axis in a rectangular coordinate system, and the receiving array antenna comprises the N antenna elements $A_{R1}$ to $A_{RN}$ one spaced apart from another by a distance d along the X axis in the positive direction thereof starting from the origin, while the transmitting array antenna comprises the two (M=2) antenna elements $A_{T1}$ and $A_{T2}$ located outwardly of the outermost receiving antenna elements.

Turning back to FIG. 1, the system reference signal generated by the oscillator module 10 is denoted by $V_S(t)$, the modulating signal for $A_{T1}$, generated by the code generator 20 that generates the mutually orthogonal codes, is denoted by $V_{C1}(t)$, and the modulating signal for $A_{T2}$ likewise generated is denoted by $V_{C2}(t)$. Further, for convenience, it is assumed that $V_C(t) \equiv V_{C1}(t) + V_{C2}(t)$; then, probe signals from the respective transmitting antenna elements are given as $V_{T1}(t) = V_S(t)V_{C1}(t)$ and $V_{T2}(t) = V_S(t)V_{C2}(t)$, respectively. If PN code sequences $[C_1^1, \ldots, C_{Q1}^1]$ and $[C_1^2, \ldots, C_{Q2}^2]$ of code lengths Q1 and Q2, for example, are assigned as the orthogonal codes to $A_{T1}$ and $A_{T2}$, respectively, $V_{C1}(t)$ and $V_{C2}(t)$ are specifically expressed as shown below in relation to the pulse waveform p(t) that carries the code and the pulse chip durations $T_{C1}$ and $T_{C2}$.

$$v_{C1}(t) = \sum_{n=-\infty}^{\infty} c^1_{mod(n,Q1)} p(t - nT_{C_1}) \quad (1)$$

$$v_{C2}(t) = \sum_{n=-\infty}^{\infty} c^2_{mod(n,Q2)} p(t - nT_{C_2}) \quad (2)$$

Referring again to FIG. 4, if there are L independent targets within the detection range of the apparatus, and if the m-th target (m=1 to L) is located at a relative line-of-sight distance $d_m$ and at an angle $\theta_m$ (with the positive part of the y-axis as the starting point, angles measured in the clockwise direction are taken as positive), then the RF demodulated echo signal, $X_m(t)$, is expressed as shown below. The, $\tau_m$ is the delay time, which is given as $\tau_m = 2d_m/C_0$, where $C_0$ is the velocity of light.

$$x_m(t) = v_S(t) v_S^*(t - \tau_m) v_C^*(t - \tau_m) \quad (3)$$

Since the phase difference of $X_m(t)$ arriving at the k-th receiving antenna element $A_{Rk}$ (k=1 to N) relative to $X_m(t)$ arriving at $A_{R1}$ is expressed as $$\phi_m^k = -\frac{2\pi}{\lambda}(k-1)d\sin(\theta_m) \quad (4)$$

the baseband signal, $V_{1k}(t)$, obtained by demodulating the output of $A_{Rk}$ by the PN code signal $V_{C1}(t)$ assigned to $A_{T1}$, is expressed by the following equation together with a noise signal $n_k(t)$.

$$v_{1k}(t) = v_{C1}(t) \left[ \sum_{m=1}^{L} x_m(t) \exp(j\phi_m^k) + n_k(t) \right] \quad (5)$$

For simplicity, noting only the process for demodulating the m-th signal component in the above equation by the PN code, the demodulation process is expressed as $$v_{C1}(t)v_C^*(t - \tau_m) = v_{C1}(t)v_{C1}^*(t - \tau_m) + v_{C1}(t)v_{C2}^*(t - \tau_m) \quad (6)$$

$$= \sum_{x=-\infty}^{\infty} \sum_{y=-\infty}^{\infty} C^1_{mod(x,Q1)} C^{1*}_{mod(y,Q1)} p(t - xT_{C1})$$

$$p^*(t - yT_{C1} - \tau_m) +$$

$$\sum_{x=-\infty}^{\infty} \sum_{y=-\infty}^{\infty} C^1_{mod(x,Q1)} C^{2*}_{mod(y,Q2)} p(t - xT_{C1})$$

$$p^*(t - yT_{C2} - \tau_m)$$

Since the demodulator in FIG. 1 has the configuration shown, for example, in FIG. 3, and performs the integration by multiplying the incoming signal with the demodulating PN code signal while varying the amount of shift, $xT_{C1}$, of the PN code signal, if the transmitted code signal and the demodulating code signal, including its delayed version, are in phase, the first term on the right-hand side of the equation (6) is, for example, 1 for each integration interval (if out of phase, −1/(code length)). On the other hand, since $\{C^1\}$ and $\{C^2\}$ are orthogonal to each other, the second term on the right-hand side of the equation (6) is always 0.

Then, setting $n_k(t) \equiv V_C(t)n_k(t)$ and $X_m(t) \equiv V_S(t)V^*_S(t - \tau_m)$, the baseband signal associated with $A_{T1}$, after demodulation, is given as $$v_{1k}(t) = \sum_{m=1}^{L} X_m(t) \exp(j\phi_m^k) + n_k(t) \quad (7)$$

and the spatial phase of vector $V_1(t) = [V_{11}(t), \ldots, V_{1N}(t)]^T$ constructed by arranging these baseband signals forms the equiphase surface 1 in FIG. 4.

Likewise, the phase difference of $X_m(t)$ arriving at $A_{Rk}$ relative to $X_m(t)$ arriving at $A_{RN}$, the reference antenna in this case being spaced (N−1)d away from the reference antenna in the above case, is expressed as $$\phi_m^k = -\frac{2\pi}{\lambda}[k-1-(N-1)]d\sin(\theta_m) \quad (8)$$

$$= \frac{2\pi}{\lambda}(N-k)d\sin(\theta_m)$$

Therefore, similarly to the above case, the baseband signal, $V_{2k}(t)$, obtained by demodulating the output of $A_{Rk}$ by the PN code signal $V_{C2}(t)$ assigned to $A_{T2}$, is given as $$v_{2k}(t) = \sum_{m=1}^{L} x_m(t)\exp(j\phi_m^k) + n_k(t) \quad (9)$$

and the spatial phase of $V_2(t)=[V_{21}(t), \ldots, V_{2N}(t)]^T$ constructed by arranging these baseband signals forms the equiphase surface 2 in FIG. 4.

Accordingly, if the variation of the target angle that occurs during the demodulation with the PN code is sufficiently small, and if the system is stable to the shifting of the phase origin (to maintain the similarity of electromagnetic coupling, etc., the reference position of the receiving antenna element with respect to the transmitting antenna element is rotationally symmetrical), then by the synthetic aperture using the extended signal vector defined by the following equation, the present invention can achieve an effective aperture of 2Nd with the physical aperture of Nd for the time interval longer than the time required for all the 2N demodulators 26 to accomplish synchronization acquisition.

$$v(t)=[v_1(t), v_2(t)]^T \quad (10)$$

Figure 5:
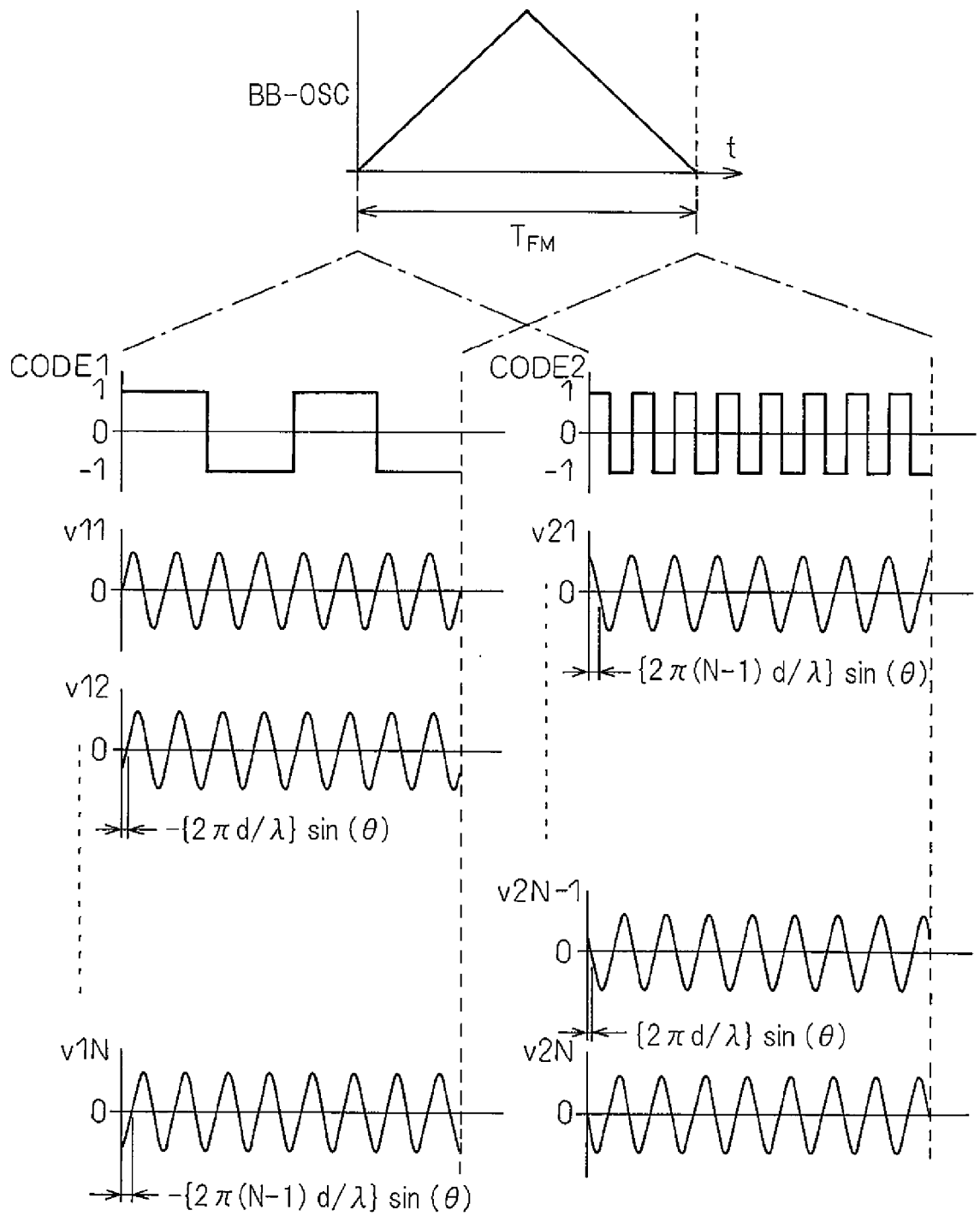
FIG. 5 is a schematic diagram showing output signals of respective ports in FIG. 4.

FIG. 5 is a timing chart schematically illustrating the output signal of each port, for example, when the signal from the oscillator module 10 is a carrier wave frequency-modulated by a triangular wave; here, it can be seen that an array signal vector having an aperture of 2Nd is obtained during one period $T_{FM}$ of the FM modulation input.

The amount of delay indicated by the delay index output from the counter 66 in the demodulator 26 shown in FIG. 3, after the synchronization acquisition, corresponds to the distance to the target. In other words, when the delay index output from the counter 66 is denoted by m, the chip duration of the PN code by Tc, the distance to the target by d, and the velocity of light by c, since the relation $$mT_C=2d/c$$

holds, the distance to the target can also be calculated from $$d=cmT_C/2$$

Accordingly, when employing FM-CW as the basic system, if $T_C$ is made too small, the determination of the distance by the PN code is done first, that is, the signal from a target located at a specific distance is selected and passed to the subsequent processing stage (stated another way, this is equivalent to filtering the incoming signal based on the distance). Therefore, if the main objective is to enlarge the antenna aperture, it is desirable to set $T_C$ not shorter than the maximum delay time to be measured (which is determined by the maximum detection range). In other words, while the main object to be achieved by the present invention is to enlarge the antenna aperture in real time by multiplexing the physical aperture in code space, the filtering effect which may be an attendant effect is also an essential feature of the present invention.

From another standpoint, if the chip rate of the PN code is increased, the distance can be measured with good accuracy, but on the other hand, the bandwidth of the transmitter wave also expands, which is disadvantageous when it comes to measuring distances at long range where interference with other apparatus' becomes a problem. In view of this, preferably, the same apparatus can be used as SS (Spread Spectrum) radar which measures the distance to the target by the same method as described above by stopping the triangular modulation. In this case, relative velocity can also be measured by determining the Doppler frequency by applying FFT as in the case of FM-CW radar.

For example, if the control input to the voltage-controlled RF oscillator 14 in the oscillator module 10 in FIG. 1 is switched suitably or in time division fashion under instruction from the CPU 31 in FIG. 1, the apparatus can be used not only as FM-CW radar but also as SS radar. In this case, if the chip rate of the PN code being generated by the code generator 20 is switched in synchronized fashion, it becomes possible to use the apparatus as FM-CW radar to measure targets at long range and as SS radar to measure targets at short range with high accuracy.

Further, if the oscillator module 10 is made to select the transmitter wave frequency-modulated by the triangular wave, and the code generator 20 is made to generate the PN codes for the respective modulators $16_1$ and $16_2$ by changing the chip rate between them (of course, while maintaining orthogonality between them), the range measuring by FM-CW radar and the range measuring by SS radar can be performed at the same time, though the effective aperture remains at Nd.

When switching the operation between FM-CW radar and SS radar in time division fashion, or when simultaneously operating FM-CW radar and SS radar, the distances, $d_{FM}$ and $d_{SS}$, measured for the same target by the respective radars can be used to calculate the range measuring error $\delta d$ of the lower accuracy FM-CW radar, i.e., $$\delta d = d_{FM} - d_{SS}$$

and $d_{FM}$ can be corrected using $d_{SS}$.

For example, if the vehicle traveling ahead of the apparatus-equipped vehicle is radiating backward a radar wave spread by the same code as the code used in the apparatus-equipped vehicle, the radar wave will be directly picked up by the receiving antenna elements $A_{R1}$ to $A_{RN}$, causing interference and resulting in an inability to make accurate measurement. If this happens, the transmitting antenna elements $A_{T1}$ and $A_{T2}$ are caused to stop transmitting, and the outputs of the demodulators $26_{11}$ to $26_{2N}$ are checked to determine the code that the vehicle traveling head is using; then, by changing the code used in the apparatus-equipped vehicle by an instruction from the CPU 31, the interference can be avoided.

Figure 6:
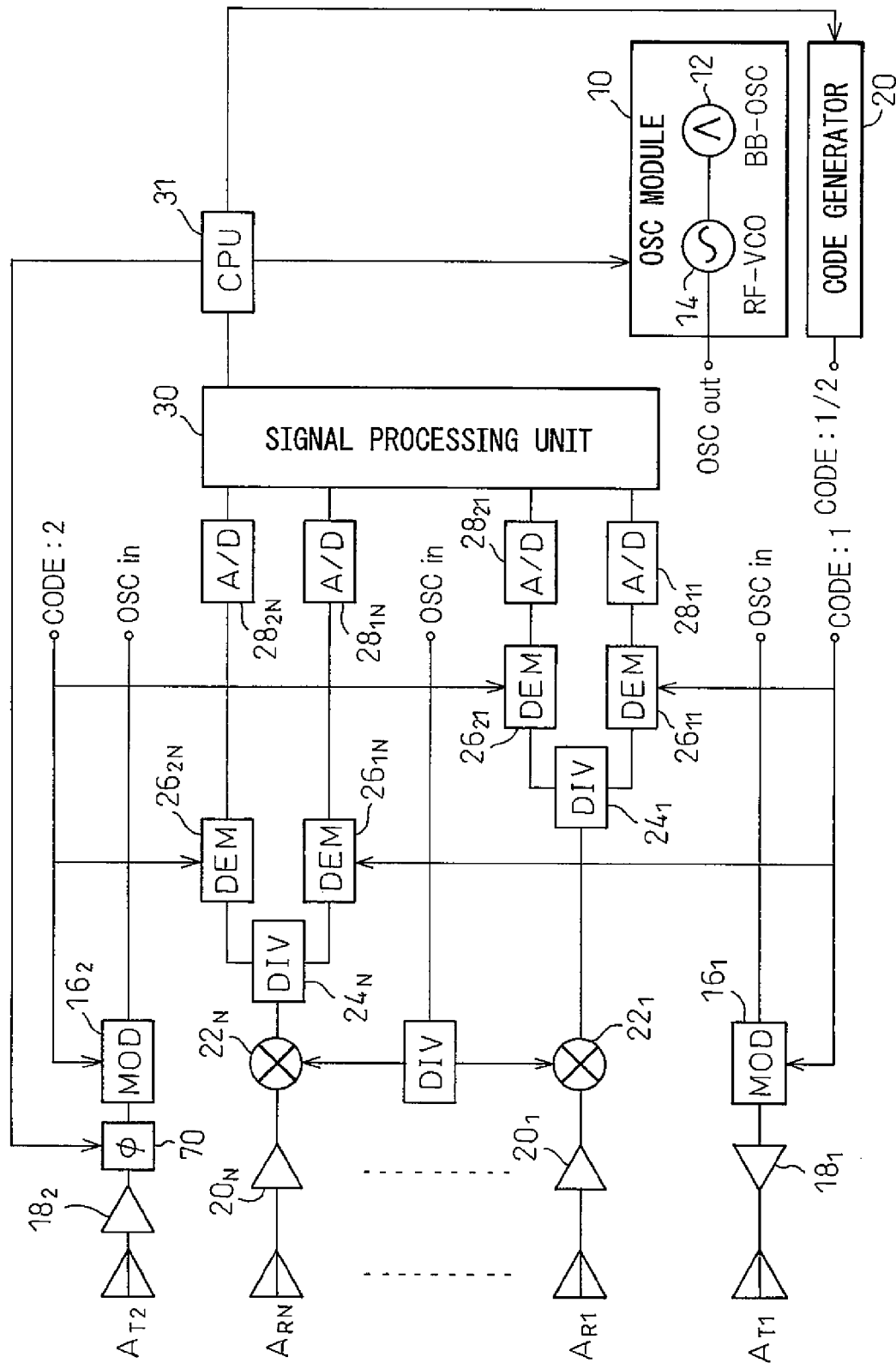
FIG. 6 is a block diagram of a radar apparatus according to according to one modified example.

FIG. 6 shows the configuration of a radar apparatus according to a modified example of the radar apparatus shown in FIG. 1. The same component elements as those in FIG. 1 are designated by the same reference numerals, and the description thereof will not be repeated here.

A phase shifter 70 is provided between the modulator $16_2$ and the power amplifier $18_2$ (or between the modulator $16_1$ and the power amplifier $18_1$). In a normal mode in which the direction of the target is determined by using the method described thus far, the phase shifter 70 is rendered inoperative with its phase shift amount set to zero, but is made operative in a tracking mode in which target tracking is performed by directing the transmit beam to the target after the direction of the target has been determined in the normal mode. In the tracking mode, the phase shift amount φ necessary to direct the transmit beam in the direction θ of the target to be tracked is determined based on the target's direction θ determined in the normal mode, and the CPU 31 sets the phase shifter 70 accordingly. With the two antenna elements outputting transmitter waves shifted in phase difference by φ, the transmitter waves are directed in the specific direction θ thus making it easier to track the target of interest. After the tracking is started, the phase shift amount φ is updated using the target's direction θ estimated from the signals received by the antenna elements $A_{R1}$ to $A_{RN}$, and the updated phase shift amount φ is fed back to the phase shifter 70 under the control of the CPU 31. It is desirable that the switching between the normal mode and the tracking mode be performed by calculating the degree of danger according to the velocity and position of the target.

In the array antenna configuration shown in FIGS. 1 and 4 in which the receiving antenna elements are arranged at equally spaced intervals with two transmitting antenna elements placed on both sides thereof, the received data associated with one transmitting antenna and the received data associated with the other transmitting antenna are in a rotational invariance relationship with respect to each other (i.e., they can be regarded as one linear antenna). Therefore, the apparatus of the present invention can be used advantageously when super resolution angle measurement techniques such as the ESPRIT algorithm using the rotational invariance relationship are applied to the direction-of-arrival estimation in the signal processing unit 30.

Figure 7:
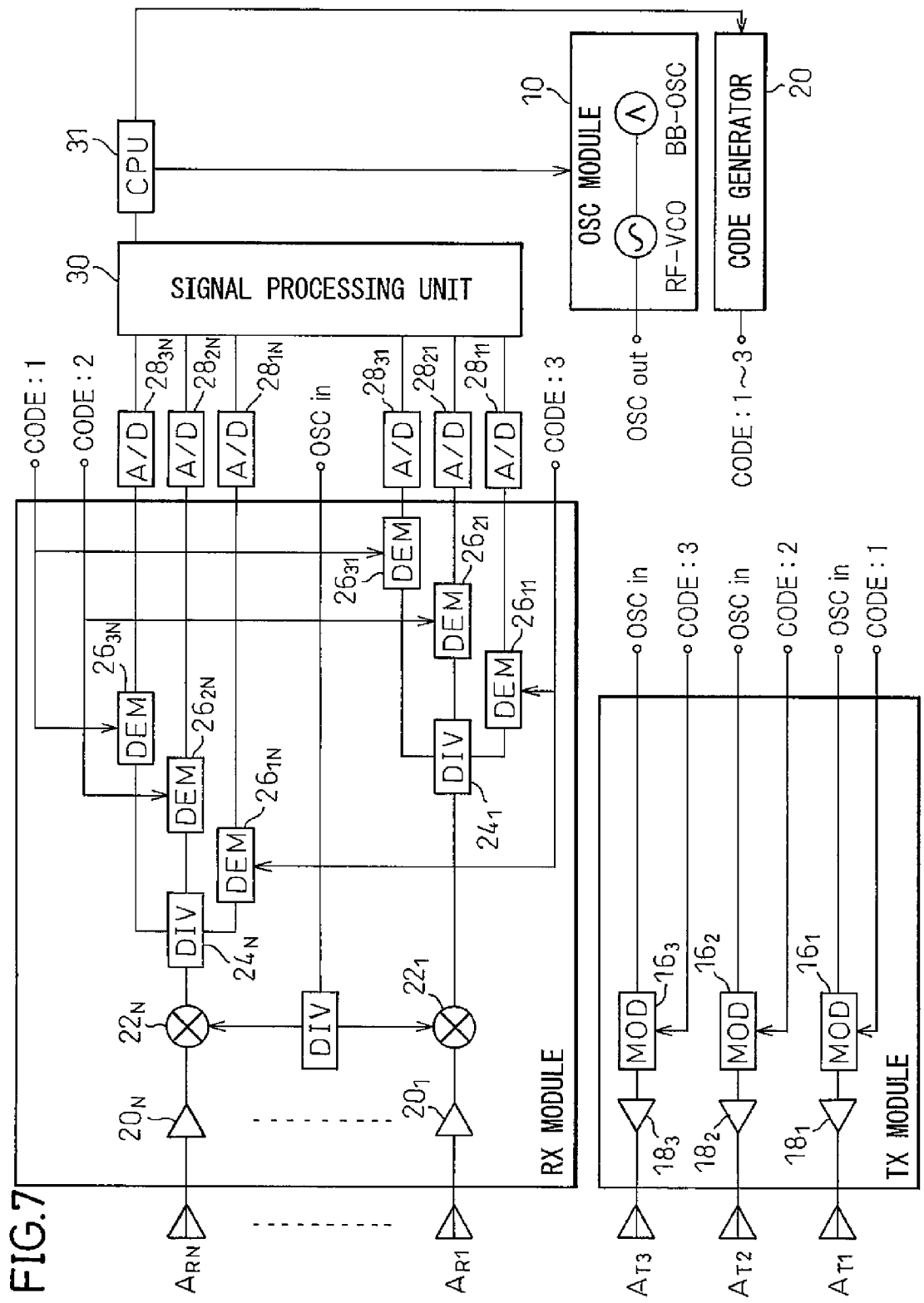
FIG. 7 is a block diagram showing an alternative example of antenna configuration.

However, the present invention is not limited to the antenna configuration described above, but can also be applied to an antenna configuration such as described in JP 2000-155171A in which, as shown in FIG. 7, a plurality of transmitting antenna elements $A_{T1}$ to $A_{TM}$ (M=3 in the figure) are placed on one side of the array of receiving antenna elements $A_{R1}$ to $A_{RN}$. In this configuration, by spacing the M transmitting antenna elements $A_{T1}$ to $A_{TM}$ apart by a distance $d_T$ that is N times as great as the distance $d_R$ by which the receiving antenna elements are spaced apart, that is, by setting $d_T = N \cdot d_R$, the effective aperture of the receiving antenna can be increased by M times.

In FIG. 7, the code generator 20 generates mutually orthogonal M PN codes (M=3 in the figure) and supplies them to M modulators $16_1$ to $16_M$. The signals received by the receiving antenna elements $A_{R1}$ to $A_{RN}$ are respectively split by splitters $24_1$ to $24_N$ into M parts, and supplied to demodulators $26_{11}$ to $26_{MN}$ (M=3 in the figure).

The invention claimed is:

1. A detection and ranging apparatus comprising:
spreaders for generating spread transmitter waves;
transmitting sensor elements for transmitting the spread transmitter waves;
receiving sensor elements for receiving reflected transmitter waves from targets; wherein
said spreaders are configured as M spreaders for receiving transmitter waves from an oscillator and generating M spread transmitter waves by spreading the transmitter waves using mutually orthogonal M orthogonal codes, where M is an integer not smaller than 2;
said transmitting sensor elements are configured as M transmitter sensors for transmitting out said M spread transmitter waves;
said receiving sensor elements are configured as N receiving sensor elements separately from the transmitting sensor elements, where N is an integer not smaller than 2, and enlarge an effective aperture thereof by a combination with said transmitting sensor elements;
a receiving control part having units for receiving, from the N receiving sensor elements, the N signals of the reflected transmitter waves which have transmitted from the M transmitter sensor elements at the same time, demodulating by a demodulating unit the received N signals, wherein said receiving control part is operative to split by splitting unit each of the N received signals into M parts and generate M×N despread outputs by despreading at despreading means the M parts using the M orthogonal codes given from a code generator so that the M×N despread outputs are processed in parallel;
a direction-of-arrival estimating part for estimating, based on said M×N despread outputs, directions of arrival of the reflected transmitter waves from the targets; and
a processor for applying a control input to the oscillator for switching the oscillator output to operate the detection and ranging apparatus as at least one of FM-CW radar and SS radar.

2. The detection and ranging apparatus according to claim 1, wherein said M spreaders each include a BPSK modulator for spreading said transmitter wave by binary phase-shift keying (BPSK) said transmitter wave with a corresponding one of said orthogonal codes.

3. The detection and ranging apparatus according to claim 1, further comprising a transmitter wave generator for selectively generating one of a carrier wave frequency-modulated by a triangular wave and an unmodulated carrier wave, as said transmitter wave.

4. The detection and ranging apparatus according to claim 1, wherein said N receiving sensor elements are arranged at equally spaced intervals, and
said M transmitting sensor elements are two transmitting sensor elements arranged so as to flank said N receiving sensor elements.

5. The detection and ranging apparatus according to claim 4, further comprising a phase shifter for adjusting the phase of a radio wave to be radiated from at least one of said two transmitting sensor elements.

6. The detection and ranging apparatus according to claim 1, wherein said N receiving sensor elements are arranged at equally spaced intervals, and
said M transmitting sensor elements are arranged one spaced apart from another by a distance that is N times as great as the distance by which said N receiving sensor elements are spaced apart.

7. A detection and ranging method of detecting a direction of arrival of a signal, comprising:
generating M spread transmitter waves by receiving transmitter waves from an oscillator and spreading the transmitter waves using mutually orthogonal M orthogonal codes at M spreaders, where M is an integer not smaller than 2;
transmitting out said M spread transmitter waves from M transmitter sensors;
receiving, at N receiving sensor elements, the N received signals of the reflected transmitter waves which have transmitted from the M transmitter sensors at the same time, while enlarging an effective aperture of the receiving antenna by the combination with the M transmitting antennas;
demodulating the N received signals;
splitting each of the N received signals into M parts;
generating M×N despread outputs by dispreading the M parts using said M orthogonal codes;

processing the M×N despread outputs in parallel;

estimating, based on said M×N despread outputs, a direction of arrival of the reflected transmitter waves from targets; and controlling said oscillator to operate the detection and ranging apparatus as at least one of FM-CW radar and SS radar.

8. A detection and ranging apparatus comprising:

M spreaders for generating M spread transmitter waves by spreading a transmitter wave using mutually orthogonal M orthogonal codes, where M is an integer not smaller than 2;

M transmitting sensor elements for transmitting out said M spread transmitter waves;

N receiving sensor elements, where N is an integer not smaller than 2;

a receiving control part for splitting each of N received signals obtained at said N receiving sensor elements into M parts, and for generating M×N despread outputs by dispreading the M parts using said M orthogonal codes; and a direction-of-arrival estimating part for estimating, based on said M×N despread outputs, directions of arrival of reflected signals arriving from a plurality of targets, wherein said M orthogonal codes includes a first orthogonal code and a second orthogonal code having a higher chip rate than said first orthogonal code, and at least the transmitter wave spread by said first orthogonal code is a carrier wave frequency-modulated by a triangular wave, said apparatus further comprising a first distance calculating part for taking as an input the despread output produced by despreading with said first orthogonal code, and for calculating a distance to a target from the frequency of said despread output in an upsweep section of said triangular wave and the frequency of said despread output in a downsweep section of said triangular wave, and a second distance calculating part for taking as an input the despread output produced by despreading with said second orthogonal code, and for calculating the distance to said target from the phase of said second orthogonal code used for said despreading.

9. The detection and ranging apparatus according to claim 8, further comprising:

a correcting part for correcting the distance calculated by said first distance calculating part, based on a difference between the distances calculated by said first and second distance calculating parts for the same target.

* * * * *